June 2, 1970 J. SELLERS 3,514,876
EDUCATIONAL DEVICE
Filed Nov. 30, 1967
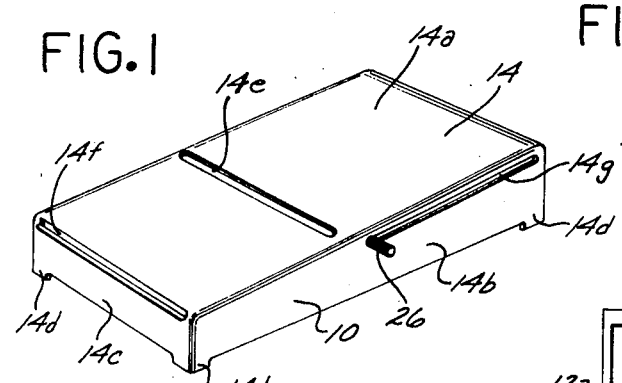
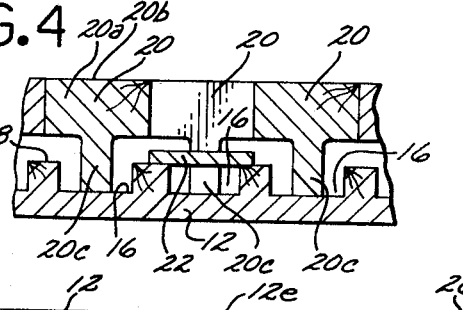
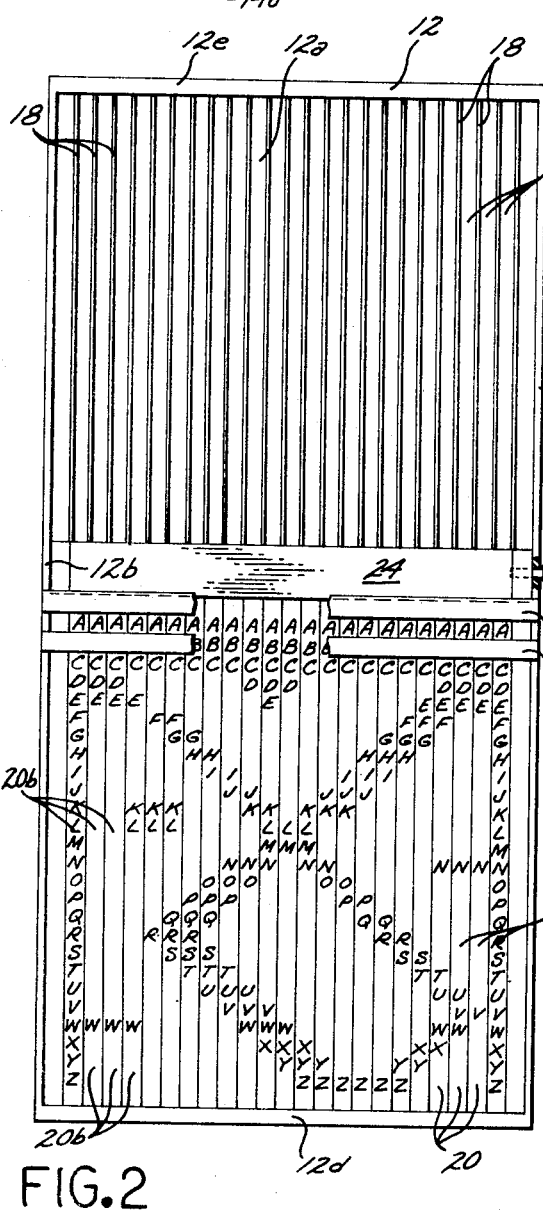
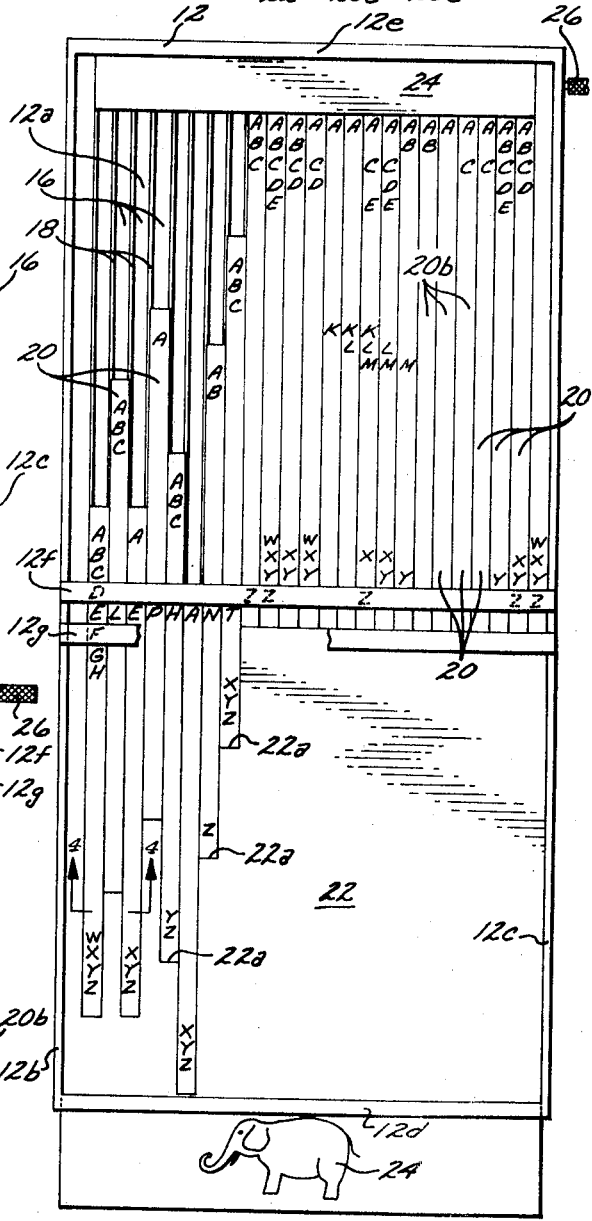
INVENTOR.
JACK SELLERS
BY
ATTORNEY

United States Patent Office

3,514,876
Patented June 2, 1970

3,514,876
EDUCATIONAL DEVICE
Jack Sellers, 12361 Emrys Ave.,
Garden Grove, Calif. 92640
Filed Nov. 30, 1967, Ser. No. 686,862
Int. Cl. G09b 1/28
U.S. Cl. 35—75        9 Claims

ABSTRACT OF THE DISCLOSURE

An educational device formed with a plurality of movable alphabet bars for arranging words viewable through a window or frame. Such alphabet bars are arranged to make such words by use of a template, and each alphabet is T-shaped in cross-section and is movable in a U-shaped channel.

---

The present invention relates generally to educational devices, and more particularly to teaching means for developing an association between different object or words, or between words and objects.

Within recent years, greater emphasis has been placed on education, particularly the education of very young children. It has been determined that pre-school children are extremely receptive to new ideas and have an unusually good capability of learning words, phrases and the like. In this regard, it has been discovered that very young children are capable of learning a language at a much faster rate than are older children and adults.

Various types of educational devices or toys have heretofore been provided, including devices of the general type or character as disclosed herein. However, such prior devices have been less than satisfactory when operated by adults as well as young people. They have been so constructed as to malfunction readily as a result of only moderately heavy use.

Prior educational devices have utilized alphabet bars for exposing through a window certain words or phrases, but they have been so constructed that the alphabet bars become misaligned and bind together thus rendering the entire device inoperable. In order to try to overcome this disadvantage, other devices have utilized means for spacing the alphabet bars an appreciable distance from each other. However, this has resulted in an undesirable device, due to the relatively wide spacing between the letters of the words.

It has been realized for some period of time that it would be desirable to have an educational device of this general class wherein the alphabet bars could be placed in juxtaposed position, and wherein they could be quickly, easily and effectively moved with respect to each other without binding and sticking.

The present invention has as an object the provision of an educational device having information members which are rectilinearly movable with respect to each other and which are substantially free of sticking and binding.

Another object of the present invention is to provide an educational device as characterized above wherein the information members are juxtaposed in substantially coplanar relation, but wherein the guide and support means therefor is such as to prevent binding and sticking upon relative movement thereof.

A further object of the present invention is to provide support means for the information members as well as for a template used in prearranging the members, which support means comprises a generally U-shaped channel for each information member as well as upstanding shoulders to support the template.

A still further object of the present invention is to provide an educational device as characterized above wherein the combination support means directs the template toward the information members such as to prevent cocking and corresponding binding of the information members.

An even further object of the present invention is to provide an educational device as characterized above which is simple and inexpensive to manufacture and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIG. 1 is a perspective view of an educational device according to the present invention;

FIG. 2 is a top plan view of the device of FIG. 1, the cover thereof having been removed;

FIG. 3 is a top plan view similar to FIG. 2, showing the use of a template; and

FIG. 4 is a fragmentary sectional view showing the information members, taken substantially along line 4—4 of FIG. 3.

Like reference characters indicate corresponding parts throughout the several views of the drawings.

Referring to FIG. 1 of the drawings, there is shown therein an educational device 10 according to the present invention. Such device comprises generally a frame 12, shown more particularly in FIGS. 2, 3 and 4 and a cover or housing 14 on said frame.

It is contemplated that the cover 14 may be formed of any appropriate material though it can be made decorative and attractive if formed of modern-day plastics. In this regard, it is contemplated that it can be formed of sheet material by a stamping and punching process, or it may be molded or pressed-formed if made of plastic.

Cover 14 is formed with a top wall 14a, opposite side walls 14b and opposite end walls 14c. As indicated in FIG. 1 of the drawings, cover 14 may also be provided with supporting legs 14d to not only enhance the appearance of the device but also to provide optimum support for it on a table top or other horizontal surface. As will be readily apparent to those persons skilled in the art, it is desirable to dispose top wall 14a at a slight angle to the horizontal when the device is placed on a horizontal surface. This enables the user to more readily view the results afforded by the educational device 10.

Cover 14 is provided with a through opening in its top wall 14a to provide a frame or window 14e through which information indicia can be exposed or viewed. Said cover 14 is also formed with a slot 14f at or near the juncture of wall 14a and end wall 14c, for receiving a template as will hereinafter be explained. A longitudinal slot 14g is provided in the side wall 14b, as shown in FIG. 1, said slot being disposed substantially parallel to the top wall 14a.

Frame 12, as shown most particularly in FIGS. 2, 3 and 4, is formed with a bottom wall 12a, side walls 12b and 12c and end walls 12d and 12e. Although such frame may be formed of any appropriate material such as plastic, metal, cardboard and the like, it is shown in the drawings as being formed of wood. This is also a usable material, although in mass production it would be more desirable to form such frame in a stamping or molding process out of metal or plastic.

Affording supporting means for information members as well as a template, both of which will be hereinafter described in detail, are generally U-shaped channels 16. Channels may be formed with the initial formation of frame 12 by the provision of upstanding shoulders 18 as shown in FIG. 4 of the drawings. Such shoulders 18 extend the entire length of the device 10, between the end walls 12d and 12e of frame 12, to thereby extend the channels 16 the length of the device.

Such channels, as shown most clearly in FIG. 4 of the drawings, are generally U-shaped to provide a trough or guide means for the information members. It should be noted, however, that in addition to effectively guiding such information members, such channels, by virtue of the upstanding shoulders 18, also constitute support means for the template.

As indicated, positioned within each of channels 16 is an information member or bar 20. As shown in FIG. 4 of the drawings, each such member 20 is formed with a generally T-shaped cross-section, and may be of metal, plastic, wood and the like. Each such member is approximately one-half the length of the frame so that its entire length can be exposed through the window or frame 14e.

The enlarged upper or indicia portion 20a of each information member 20 is provided with suitable indicia on the surface 20b. Such indicia, as is well understood by those persons skilled in the art, may take substantially any desired form, but perhaps it is most likely to constitute all of the letters of the alphabet as shown in FIGS. 2 and 3.

Such indica could, of course, take other forms such as pictures, drawings or even individual objects. The indicia might be provided on surface 20b by painting, silk-screening, drawing or the like, or such indicia may be provided on a separate piece of paper which is bonded to the surface 20b.

One of the important characteristics of the subject device is that the indicia portions 20a of the various information members 20 are juxtaposed in a generally coplanar relation. This assures that the various letters from adjacent information members are sufficiently close to be properly physically related in spelling a word. Thus, the indicia portions 20a of adjacent information members actually abut each other, even during relative movement therebetween.

The lower portion 20c of each information member 20 is relatively narrow to provide guide means which loosely fits within the respective guide channel 16. The loose nature of such fit is important to prevent binding of the information members on the frame 12.

A template 22, shown most clearly in FIG. 3 of the drawings, is provided for insertion through the slot or opening 14f in cover 14. Such template is provided with generally parallel but offset marginal edges 22a which engage the respective information members 20 in the manner to be hereinafter described. Such template, as shown in FIG. 3, may include an object or picture thereof as shown at 24, which object may be related to the word to be displayed by the device 10.

Template 22 may be one of a series or group of templates each of which is intended to relate a given object to a certain word.

The template, upon insertion through the slot 14f is caused to rest upon the upstanding shoulders 18 of frame 12. Such shoulders provide supporting means for the template 22 in addition to forming the above-described channels 16. Such support for template 22 is desirable, if not mandatory, to insure that each marginal edge 22a of template 22 engages the respective information member 20 at the proper location. That is, such engagement should be made on the information member a predetermined distance above the lowermost edge of the guide portion 20c. This is to insure that the force exerted on the information members does not tend to twist or cock them and thereby cause binding thereof. It has been found that this is very desirable in view of the fact that the indicia portions 20a of the adjacent information members rub together to offer some resistance due to frictional forces therebetween. Thus, by having the force from the template 22 as close as possible to such resistance, the usual relatively large bending moments or force couples are prevented from occurring on the information members. Thus, binding of such members is prevented.

As indicated in FIG. 3 of the drawings, the offset marginal edges 22a are provided in the template 22 in accordance with the desired movement of the information members 22 to effect the proper display through the window or frame 14e. The marginal edges 22 a of the template shown in such figure effectively position the first eight information members such ts to display the word "ELEPHANT." The device 10 shown in the drawings comprises structural members 12f and 12g which extend between the side walls 12b and 12c of frame 12 to define the frame afforded by opening 14e of cover 14.

A return bar 24 is provided on the upstanding shoulders 18 for use in returning all of the information members 20 to their original positions shown in FIG. 2 of the drawings. A finger operated screw or lever 26 is provided in the end of return bar 24 to extend through the slot 14g in cover 14. Such bar 24 is moved upwardly to the position shown in FIG. 3 by the template inserted through the opening 14f. Thereafter, when the display through frame 14e is to be erased the bar 24 is manually returned to the position shown in FIG. 2 as the template 22 is removed. Thus, all of the information members are returned so as to permit another template to be used.

It is thus seen that the present invention provides an educational device which is capable of displaying adjacent letters in a more logical accepted manner, without causing binding or sticking of the various information members as the device is operated.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. An educational device comprising in combination, a plurality of information members individually provided with information indicia, means forming a frame for exposing therein only a portion of said indicia on each of said members, a template actuatable to arrange each of said members in predetermined relation to said frame, and support means for said information members and said template comprising a pair of upstanding shoulders on opposite sides of each member affording a pathway therefor and affording a plurality of support surfaces in a plane through the intermediate portions of said members for supporting said template, whereby said template is operable to actuate said information members without causing binding thereof.

2. An educational device according to claim 1, wherein said support means provides an elongated channel for each of said information members, and said information members are individually formed with depending guide means for cooperation with the respective channel.

3. An educational device comprising in combination, a plurality of information members individually provided with information indicia and formed with a generally T-shaped cross-section affording a depending guide portion, means forming a frame for exposing therein only a portion of said indicia on said members, a template actuatable to arrange each of said members in predetermined relation in said frame, and support means for said information members and said template providing an elongated channel for receiving said depending guide portion of each of said information members for rectilinear movement of the latter within the respective channel, said support means further providing shoulder means for supporting said template, whereby said template is operable to actuate said information members without causing binding thereof.

4. An educational device comprising in combination, a plurality of information members individually provided with information indicia, means forming a frame for exposing therein only a portion of said indicia on each of said members, a template actuatable to arrange each of said members in predetermined relation to said frame, and support means for said information members and said template providing an elongated channel for each information member, said channel being generally U-shaped for receiving the respective information member and for providing upstanding shoulders on either side thereof for supporting said template, whereby said template is operable to actuate said information members without causing binding thereof.

5. An educational device according to claim 4, wherein said upstanding shoulders are elevated a predetermined distance above the bottom of said channels to insure that said template engages each of said information members a given distance above the lowermost surface of said guide portion to prevent binding of said information members.

6. An educational device according to claim 5, wherein each of said information members is formed with a generally T-shaped cross-section providing a relatively wide surface for carrying said information indicia, said information members being juxtaposed at said surfaces while said guide means therefor are separated and positioned in said individual channels.

7. An educational device according to claim 6, wherein said frame means comprises a cover formed with a through opening providing said frame for exposing only a portion of each of said information members.

8. An educational device according to claim 7, wherein said template is formed with staggered marginal edges for engagement individually with said information members, the separation of said guide portions of said information members insuring that each of said information members will be engaged by only the respective one of said marginal edges.

9. An educational device according to claim 8, wherein said staggered marginal edges are substantially parallel and offset.

References Cited

UNITED STATES PATENTS 1,902,971   3/1933   Rippon _____ 35—75

EUGENE R. CAPOZIO, Primary Examiner

W. H. GRIEB, Assistant Examiner

U.S. Cl. X.R.

35—35